United States Patent
Matsuura et al.

(10) Patent No.: US 10,654,449 B2
(45) Date of Patent: May 19, 2020

(54) WINDSCREEN WIPER CONTROL SYSTEM AND METHOD

(71) Applicants: TOYOTA JIDOUSHA KABUSHIKI KAISHA, Toyota-shi, Aichi (JP); VALEO SYSTÈME D'ESSUYAGE, La Verrière (FR)

(72) Inventors: Akira Matsuura, Toyota (JP); Yasushi Azuma, Toyota (JP); Haruki Nakamura, Toyota (JP); Tatsuya Ishikawa, Toyota (JP); Makoto Kukihara, Toyota (JP); Tsuyoshi Abe, Tokyo (JP); Stéphane Boursier, Tokyo (JP); Laurent Takejiro Pascal Ochiai Bonneville, Tokyo (JP); Philippe Frin, Chatellerault (FR); Tom Teriierooiterai, Saint Sauveur (FR); Wenhan Zhang, Shanghai (CN)

( * ) Notice: Subject to any disclaimer, the term of this patent is extended or adjusted under 35 U.S.C. 154(b) by 152 days.

(21) Appl. No.: 15/579,569

(22) PCT Filed: Jun. 5, 2015

(86) PCT No.: PCT/EP2015/062610
§ 371 (c)(1),
(2) Date: Dec. 4, 2017

(87) PCT Pub. No.: WO2016/192816
PCT Pub. Date: Dec. 8, 2016

(65) Prior Publication Data
US 2018/0170315 A1      Jun. 21, 2018

(51) Int. Cl.
*B60S 1/08*      (2006.01)

(52) U.S. Cl.
CPC ..................................... *B60S 1/08* (2013.01)

(58) Field of Classification Search
CPC ...... B60S 1/08; B60S 1/0469; B60S 1/04-44; B60S 1/3418; H01H 63/30; B60W 2710/30
See application file for complete search history.

(56) References Cited

U.S. PATENT DOCUMENTS 4,614,903 A * 9/1986 Betsch .................. B60S 1/0807
15/DIG. 15
5,773,946 A * 6/1998 Montero ............... B60S 1/0822
318/460

(Continued)

FOREIGN PATENT DOCUMENTS

DE      197 35 020 A1      2/1999
DE      101 58 176 A1      6/2003

OTHER PUBLICATIONS

International Search Report dated Jan. 29, 2016, for International Application No. PCT/EP2015/062610, filed Jun. 5, 2015, 3 pages.

(Continued)

*Primary Examiner* — Adam R Mott
(74) *Attorney, Agent, or Firm* — Christensen O'Connor Johnson Kindness PLLC

(57) ABSTRACT

A windscreen wiper control system controls a drive mechanism for at least one windscreen wiper arm to effect a reciprocating movement of the at least one windscreen wiper arm within a wiping range between a first position and a second position. The control system includes a detector that detects, upon activation of the control system, an uncertain position of the windscreen wiper arm within the wiping range but different from the first position. Upon detection of such an uncertain position, the control system returns the windscreen wiper arm to the first position at a predetermined reduced speed, the reduced speed being applied at least in a sub-range of the wiping range in the vicinity of the first position.

20 Claims, 4 Drawing Sheets

(56) References Cited

U.S. PATENT DOCUMENTS

2010/0037416 A1* 2/2010 Amagasa ................. B60S 1/08
15/250.31
2016/0375863 A1* 12/2016 Carlsson ............... B60S 1/0862
701/49

OTHER PUBLICATIONS

Written Opinion dated Jan. 29, 2016, for International Application No. PCT/EP2015/062610, filed Jun. 5, 2015, 5 pages.
International Preliminary Report on Patentability dated Dec. 5, 2017, issued in corresponding International Application No. PCT/EP2015/062610, filed Jun. 5, 2015, 1 page.

* cited by examiner

WINDSCREEN WIPER CONTROL SYSTEM AND METHOD

TECHNICAL FIELD

The present invention relates to a windscreen wiper control system for a vehicle, in particular a car. It also relates to an assembly comprising said control system and a vehicle equipped with such an assembly. It further relates to a method for controlling a driving mechanism for a windscreen wiper arm and a microchip configured for performing said method.

PRIOR ART

A car is traditionally equipped with windscreen wipers to clean the windscreen and prevent the driver's view of his surroundings being obstructed. These windscreen wipers generally include a drive arm which moves back and forth in an angular manner, and extended wiper blades, which themselves hold scraping blades made from a resilient material. These blades rub against the windscreen and remove water by moving it outside the driver's field of vision. In order to ensure a good contact, the wiper arms comprise springs, pushing the blades onto the windscreen.

A control system controls the drive mechanism to effect the movement of the windscreen wipers. The drive mechanism comprises an electric motor, communicatively connected to the control system to receive control signals. The motion of the electric motor is transferred to the windscreen wipers by means of a combination of elements, such as a gear, a drive shaft and a crank assembly. During normal wiping operation, the windscreen wipers reciprocate between first (in-wipe) and second outer positions, which define a wiping range. For service, the arm can be brought to a service position, in which the arm can be lifted from the windscreen for replacement of the wiper blade, called lock back position. When in this position and the wiper system is activated (e.g. by accidentally being switched on or as a result of motor electronic wakeup or other cause), the wiper arms would be moved back towards the first, in-wipe position (and possibly further to a park position), causing the wiper arms to collide with the hood. Further, this could cause the arms to be pushed back from the lock back and as a result of the spring force to hit the windscreen, which could cause severe damage if the wiper blades are removed at that moment. So under these conditions there is generally a risk of damage to the wiper arm(s), the hood and/or the windscreen.

Similarly, when the windscreen wipers are placed back onto the windscreen after service, or when the windscreen wiper system is stopped with the wipers in an intermediate position between the first and second outer positions, and the windscreen wiper system is subsequently activated, there is a risk that the wipers are moved too far and accidentally collide with the trailing edge of the hood. This is because the position of the wiper arms upon activation may be different from the position in which they were stopped.

DESCRIPTION OF THE INVENTION

It is an aim of the invention to provide a windscreen wiper control system, and method, with which the risk of damage to the hood and/or the windscreen can be reduced.

To this end, the present invention relates to a windscreen wiper control system for controlling a drive mechanism for at least one windscreen wiper arm to effect a reciprocating movement of the at least one windscreen wiper arm within a wiping range between a first (in-wipe) position and a second position. The control system is characterised by detecting means for detecting, upon activation of the control system, an uncertain position of the windscreen wiper arm within the wiping range but different from the first (in-wipe) position. The control system is provided, upon detection of such an uncertain position, for returning the windscreen wiper arm to the first position at a predetermined reduced speed, which is applied in at least a sub-range of the wiping range in the vicinity of the first position.

The ability to detect that the wiper arm is in a position in between the first and second positions that define the wiping range, which is according to the invention by definition an uncertain position when the wiper system is activated, and to apply a reduced speed for returning the wiper arms to the first position, has the advantage that in case there would be a collision with an edge part of the hood, the impact speed, and hence the risk of damage can be significantly reduced. Further, due to the reduced impact speed, the arms, in case they would be in lock back, would experience less force and there is less risk that they would be pushed back onto the windscreen and cause damage thereto.

According to the invention, the control system is able to determine cases where there is a risk of collision between the arm and an edge part of the hood and to proactively apply a reduced speed for moving the wiper arm back to the starting position for a wiping sequence, namely the first (in-wipe) position, or possibly further to a storage position (as explained below). The solution according to embodiments of the invention can be implemented completely in the control system without adding other hardware to existing windscreen wiper systems.

The sub-range of the wiping range, in which the reduced speed is at least applied, can be defined as a collision risk zone, i.e. a zone in which there is a risk of collision of the windscreen wiper arm with an edge part of a vehicle. In a particular embodiment, this collision risk zone may be a circle segment of for example 10°.

In a particular embodiment, the predetermined reduced speed may be below a normal wiping speed, i.e. the speed at which the wiper arms are moved during a normal wiping operation. The predetermined reduced speed may for example be below a predetermined maximum of 60°/second (10 rpm). The predetermined reduced speed is preferably between 60°/second (10 rpm) and 30°/second (5 rpm). It is remarked that the "predetermined reduced speed" does not have to be a constant speed but may be a speed that varies within a certain range below the predetermined maximum, for example a speed that starts at the predetermined maximum when the arm enters the sub-range (the collision risk zone) but is gradually further reduced towards 0 as the arm approaches the first position.

In a particular embodiment, the control system may be provided for, upon returning the windscreen wiper arm to the first position, applying a predetermined speed profile. In this predetermined speed profile, the speed of movement of the windscreen wiper arm may be a normal wiping speed as long as the windscreen wiper arm is considered to be outside said sub-range, and reduced to the predetermined reduced speed as soon as the windscreen wiper arm is considered to be enter the sub-range. In this respect, the terminology "considered to be" is used because the actual position of the wiper arm may be different from the position determined by the control system (due to the starting position being uncertain). This embodiment has the advantage that the wiper blades can be returned to the first position relatively quickly.

In an alternative embodiment, the control system may be provided for, upon returning the windscreen wiper arm to the first position, applying a predetermined speed profile in which the speed of movement of the windscreen wiper arm is the predetermined reduced speed over the whole wiping range. This embodiment has the advantage that the speed profile can be a simple speed profile.

In a particular embodiment, the control system is provided for, upon returning the windscreen wiper arm to the first position, further slowing down the movement of the windscreen wiper arm upon approaching the first position. This has the advantage that in case of collision, the impact speed can be further reduced.

In a particular embodiment, the control system comprises collision detecting means for detecting collision of the windscreen wiper arm with an obstruction such as an edge part of the vehicle, and wherein the control system is provided, upon detection of such a collision, for reversing the movement of the windscreen wiper arm to remove the arm from the obstruction. This has the advantage that in case of collision, the impact pressure can be significantly reduced, further reducing the risk of damage.

In a particular embodiment, the control system may be further provided for moving the wiper arms to at least one inactive position outside the wiping range, such as for example an intermittent pause position (in which the wipers are stationed temporarily when the user ends the wiping operation) and/or a depressed park position (a storage position in which the wipers are at least partly covered by the hood of the vehicle). In this case, the control system may be provided for, in the initial sequence when returning the wiper arm to the first position after detection of an uncertain position, further moving the wiper arm to one of the inactive positions at the predetermined reduced speed, unless a wiping sequence is to be initiated.

The invention also relates to a windscreen wiper assembly comprising at least one wiper arm, a driving mechanism and a control system according to any of the above described embodiments. Preferably the windscreen wiper arm comprises, at a location where there is a risk of collision with an edge part of the vehicle, a buffer part in a resilient material. Such a buffer part may also be provided on the trailing edge of the hood of the vehicle.

The invention also relates to a vehicle equipped with such a windscreen wiper assembly.

The invention further relates to a method for controlling a drive mechanism for at least one windscreen wiper arm to effect a reciprocating movement of the at least one windscreen wiper arm within a wiping range between a first position and a second position, the method comprising the steps of: (i) detecting, by means of detecting means of a control system for controlling the drive mechanism, upon activation of the control system, an uncertain position of said windscreen wiper arm within said wiping range but different from said first position; and (ii) upon detection of such an uncertain position, returning the windscreen wiper arm to the first position at a predetermined reduced speed, said reduced speed being applied at least in a sub-range of the wiping range in the vicinity of the first position.

In particular embodiments, the method may further comprise features or steps corresponding to those of the control system described above.

The invention further relates to a microchip for a windscreen wiper control system, configured for performing the method.

DESCRIPTION OF FIGURES

It will be easier to understand the invention and other details, characteristics and advantages of the invention will become apparent by reading the following description which is given by way of example, is by no means restrictive, and refers to the accompanying drawings in which.

DETAILED DESCRIPTION

Note that the figures show the invention in a detailed manner for the purpose of implementing the invention, but said figures could of course be used to define the invention more accurately if necessary.

In the description below, the terms "longitudinal" and "side" refer to the orientation of the wiper blade or the drive arm. The longitudinal direction corresponds to the main axis of the wiper blade or arm in which it extends, whilst the side orientations correspond to concurrent lines, in other words, lines which intersect with the longitudinal direction, in particular at a perpendicular angle to the longitudinal axis of the wiper blade or arm in its rotation plane. In the case of longitudinal directions, the terms "external" or "internal" apply with respect to the point at which the wiper blade is fixed to the arm, the term "internal" corresponding to the portion where the arm and a half-blade are extended, or with respect to a point at which the arm is fixed to the vehicle. Directions which are referred to as upper or lower correspond to orientations perpendicular to the rotation plane of the wiper blade, whilst the term "lower" includes the plane of the windscreen. The term "horizontal" refers to a plane which is substantially parallel to the windscreen plane and the term "vertical" refers to a plane which is substantially perpendicular to the windscreen plane.

Finally, the terms "upstream" and "downstream" relate to the direction of movement of the wiper blade, in the transverse direction, where the upstream orientation corresponds to the distance of the arm from its resting position and the downstream orientation corresponds to a return to this resting position.

In the following, embodiments of the invention will be described with reference to FIGS. 1 to 7.

Figure 1:
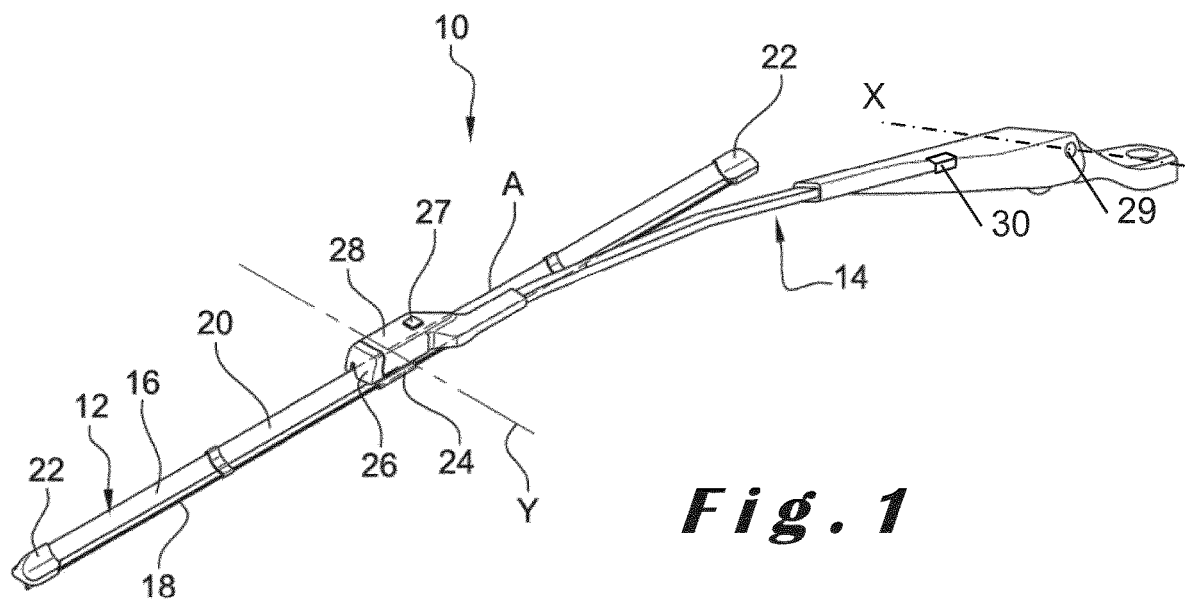
FIG. 1 is a schematic perspective view of an embodiment of a windscreen wiper according to the invention.

FIG. 1 shows an embodiment of a windscreen wiper 10 of a wiper system according to the invention. The wiper 10 comprises, in particular, a wiper blade 12 and a drive arm 14 for the wiper blade 12. The wiper blade 12 comprises a longitudinal body 16, a wiper blade rubber 18, which is generally made from rubber or a like material, and at least one vertebra (not shown) which gives the blade its rigidity and makes it easier to apply to a vehicle windscreen. The body 16 of the wiper blade 12 may comprise an upper aerodynamic deflector 20 which is intended to improve operation of the wiping system, the aim of this deflector being to improve adhesion of the wiper blade to the windscreen and thus the aerodynamic performance of the windscreen wiper. The wiper blade 12 may also comprise end fittings 22 or attachment clips for the blade 18 and the vertebra on the body 16, these end fittings 22 being located at each of the longitudinal ends of the body 16. The wiper blade 12 may comprise an intermediate connector 24 more or less in its middle. An adapter 26 rigidly attached to the arm 14 may be fitted to the connector 24 so as to retain a degree of freedom when pivoting around a hinge pin Y which is a transverse axis which is substantially perpendicular to the longitudinal axis of the wiper blade 12. This degree of freedom allows the wiper blade 12 to pivot with respect to the arm 14 and thus allows the wiper blade to follow the curvature of the windscreen when it is in motion. The adapter 26 may be disconnected from the arm 14 by pressing a pushbutton 27 located on the adapter, for example to replace the wiper blade.

The adapter 26 connects the wiper blade 12 to the arm 14 and in particular to a head or end component 28 of the arm, which may be formed in one piece with the arm or may be separate and attached to said arm. By means of the other end 29, the arm 14 is intended to be driven by a motor, either directly or via a crank assembly (not shown), in an angular back and forth motion which makes it possible to remove water and, if applicable, other undesirable elements from the windscreen. In order to ensure a good contact, the wiper arm may comprise a spring (not shown), pushing the blade onto the windscreen.

Figure 2:
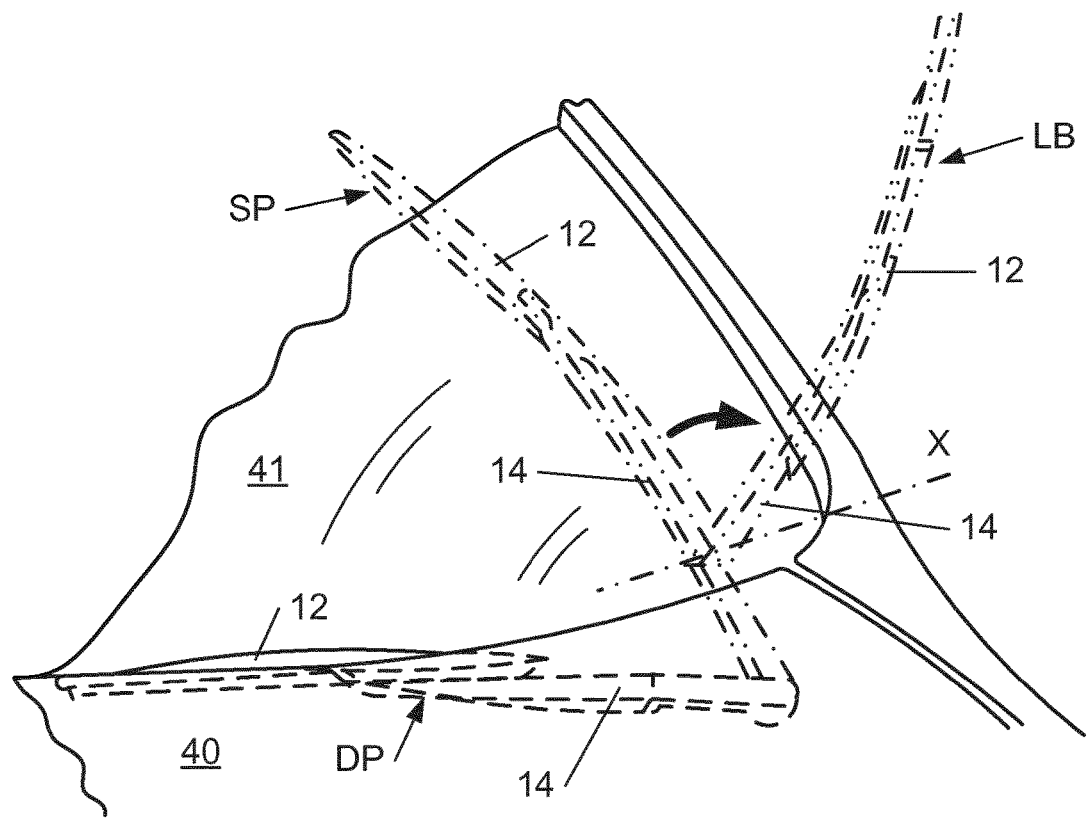
FIG. 2 is a schematic perspective view of a part of a vehicle equipped with a windscreen wiper system according to the invention.
Figure 3:
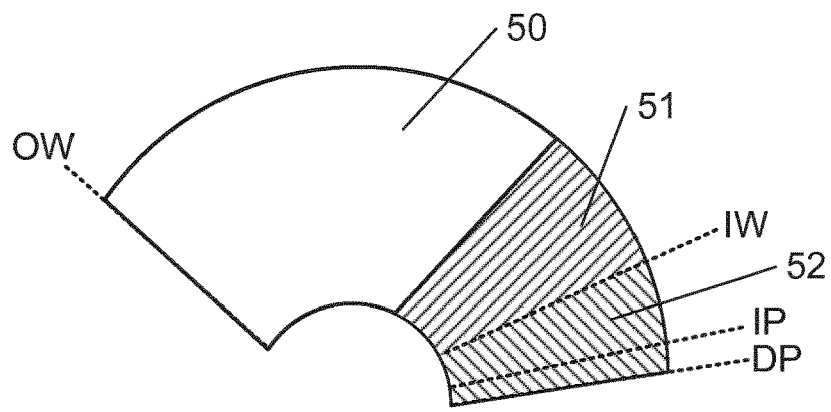
FIG. 3 is a schematic illustration of the range of movement of a windscreen wiper according to the invention.

During normal wiping operation, the windscreen wipers reciprocate between first and second outer positions, also known as in-wipe (IW) and out-wipe (OW) positions, see FIG. 3, which define a wiping range 50. In specific embodiments, the windscreen wiper may be movable in a further range 52 beyond the first position (IW) to at least one inactive position, such as for example an intermittent pause position (IP) and/or a depressed park position (DP). In the latter position, the wiper 10 is at least partly covered by the hood 40 of the vehicle as shown in FIG. 2.

For service, the arm can be brought to a service position (see FIG. 2, SP), in which the arm can be lifted from the windscreen 41, for example for replacement of the wiper blade. To this end, the wiper arm 14 is hingable about an axis X to a so-called lock back position (see FIG. 2, LB). When in this position and the wiper system is activated, e.g. accidentally switched on, the wiper arms would be moved back towards the first, in-wipe position, and possibly further to the intermittent pause or depressed park position. This may cause the wiper arm 14 to collide with the hood 40, as can be imagined from FIG. 2. Further, this could cause the arm 14 to be pushed back from the lock back and as a result of the spring force to hit the windscreen 41 of the vehicle, which could cause severe damage if the wiper blade is removed. So under these conditions there is a risk of damage to the hood 40 and/or the windscreen 41 of the vehicle.

Similarly, when the windscreen wipers 10 are placed back onto the windscreen 41 after service, or when the windscreen wiper system is stopped with the wipers 10 in an intermediate position anywhere between the first (IW) and second outer (OW) positions, and the windscreen wiper system is subsequently activated, there is a risk that the wipers are moved too far and accidentally collide with the trailing edge of the hood 40. This is because the position of the wiper arms upon activation may be different from the position in which they were stopped.

According to the invention, this risk is tackled in the windscreen wiper control system 60, which is provided for controlling the drive mechanism for the at least one windscreen wiper arm 14 to effect the reciprocating movement of the at least one windscreen wiper arm within the wiping range 50. The control system has detecting means for detecting, upon activation of the control system 60, an uncertain position of the windscreen wiper arm, which is a position within the wiping range but different from the first position (IW). This detection means may be embodied in different ways, as will be described below. The control system 60 is provided, upon detection that the position of the arm is an uncertain position, for returning the windscreen wiper arm to the first position (IW), and possibly further to the IP and/or DP position, at a predetermined reduced speed. This reduced speed is applied in at least a sub-range 51 of the wiping range 50 in the vicinity of the first position (IW).

The sub-range 51 of the wiping range, in which the reduced speed is at least applied, can be defined as a collision risk zone, i.e. a zone in which there is a risk of collision of the windscreen wiper arm with an edge part of a vehicle. In a particular embodiment, this collision risk zone 51 may be a circle segment of for example 10°.

The predetermined reduced speed is below a normal wiping speed, i.e. the speed at which the wiper arms are moved during a normal wiping operation, and may for example be a ratio of the normal wiping speed, for example half of that speed. The predetermined reduced speed may for example be below a predetermined maximum of for example 60°/second (10 rpm). The predetermined reduced speed is preferably between 60°/second (10 rpm) and 30°/second (5 rpm).

The reduced speed may be applied by applying a predetermined speed profile, examples of which are shown in FIG. 4. FIG. 4a shows the prior art situation, wherein the wiper arm 14 would be returned from the service position SP at a normal wiper operation speed profile. By way of example, a collision point "CP" is indicated where a collision with an edge part of the hood 40 could occur due to the arm 14 being in lock back state or due to the actual position of the arm being uncertain during this initial wiping sequence.

Figure 4A:
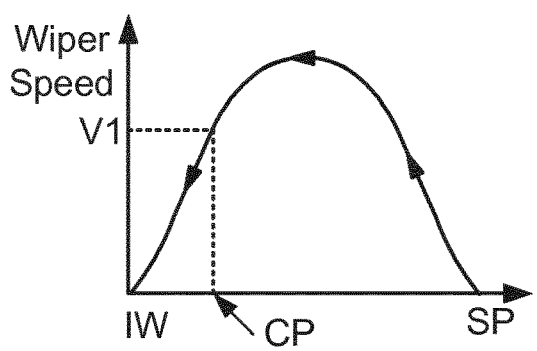
FIG. 4 is a schematic illustration of speed profiles that may be used according to the invention.
Figure 4B:
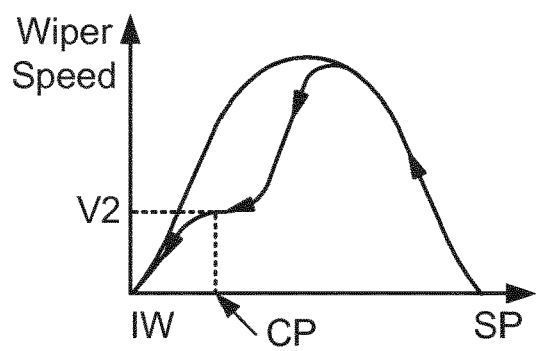

FIG. 4b shows a first example of a predetermined speed profile in which the speed of movement of the windscreen wiper arm is the normal wiping speed as long as the windscreen wiper arm is considered to be outside the sub-range 51, and in which the speed is reduced as soon as the windscreen wiper arm is considered to be within the sub-range 51. With the speed profile of FIG. 4b, the wiper blades can be returned to the first position relatively quickly. It is clear from a comparison of FIGS. 4a and 4b that at the (possible) collision point CP, the impact speed v2 is much lower in the case of FIG. 4b as compared to the impact speed v1 in the case of FIG. 4a.

Figure 4C:
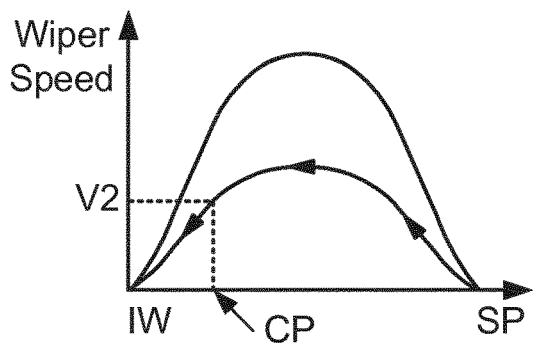

In a second example, shown in FIG. 4c, the control system may be provided for, upon returning the windscreen wiper arm to the first position, applying a predetermined speed profile in which the speed of movement of the windscreen wiper arm is reduced over the whole wiping range as compared to the normal wiping speed, for example reduced by a ratio, for example half the normal wiping speed. This embodiment has the advantage that the speed profile is a simple speed profile. Likewise, it is clear from a comparison of FIGS. 4a and 4c that at the (possible) collision point CP, the impact speed v2 is much lower in the case of FIG. 4c as compared to the impact speed v1 in the case of FIG. 4a.

In both examples of FIGS. 4b and 4c, the control system is provided for, upon returning the windscreen wiper arm to the first position (IW), further slowing down the movement of the windscreen wiper arm upon approaching the first position. This has the advantage that in case of collision, the impact speed can be further reduced.

Figure 4D:
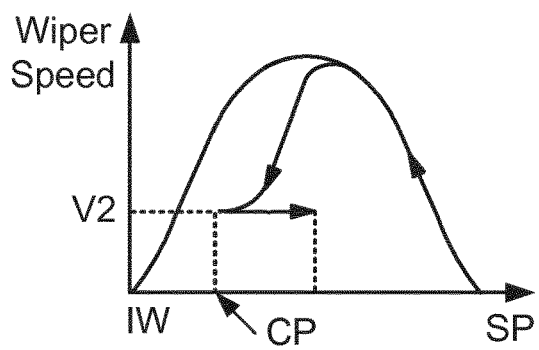

FIG. 4d shows a particular embodiment in which the control system comprises a collision detecting means for detecting collision of the windscreen wiper arm with an obstruction such as an edge part of the vehicle, and wherein the control system is provided, upon detection of such a collision "CP", for reversing the movement of the windscreen wiper arm to remove the arm from the obstruction. This embodiment has the advantage that in case of collision, the impact pressure can be significantly reduced, further reducing the risk of damage. Such a collision detecting means can be embodied in many ways, for example by detecting stall of the motor.

Figure 5:
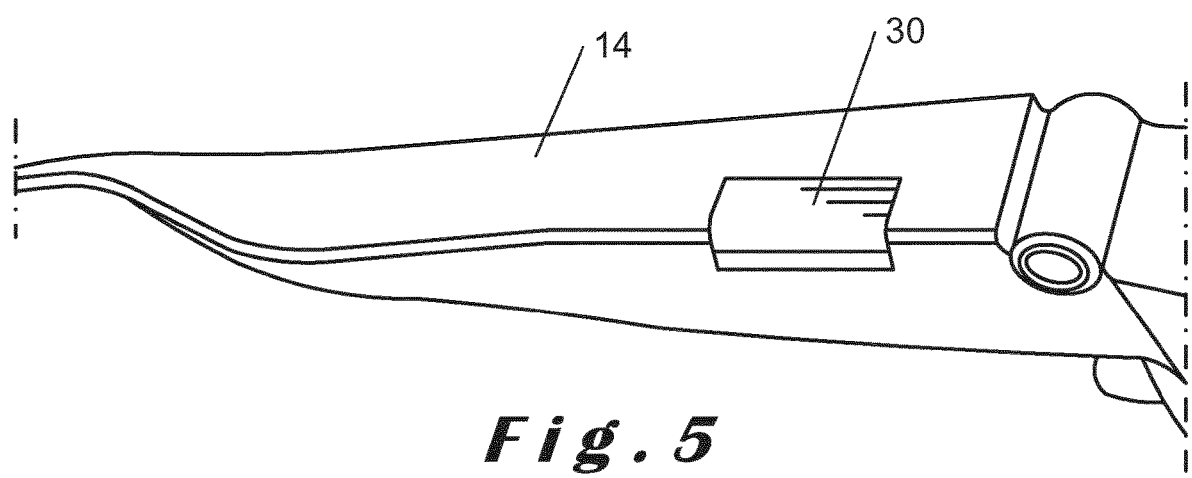
FIG. 5 is a schematic perspective view of a detail of the windscreen wiper of FIG. 1.

In preferred embodiments, as shown in FIGS. 1 and 5, the windscreen wiper arm comprises, at a location where there is a risk of collision with an edge part of the vehicle, a buffer part 30 in a resilient material. In alternative embodiments such a buffer part may also be provided on the trailing edge of the hood 40. Furthermore, the damage risk in case of collision may be further reduced by a specific shape of the arm and/or the hood edge. It is evident that a contact with a plane surface will generate less issues that a contact with a corner part of the arm.

Figure 6:
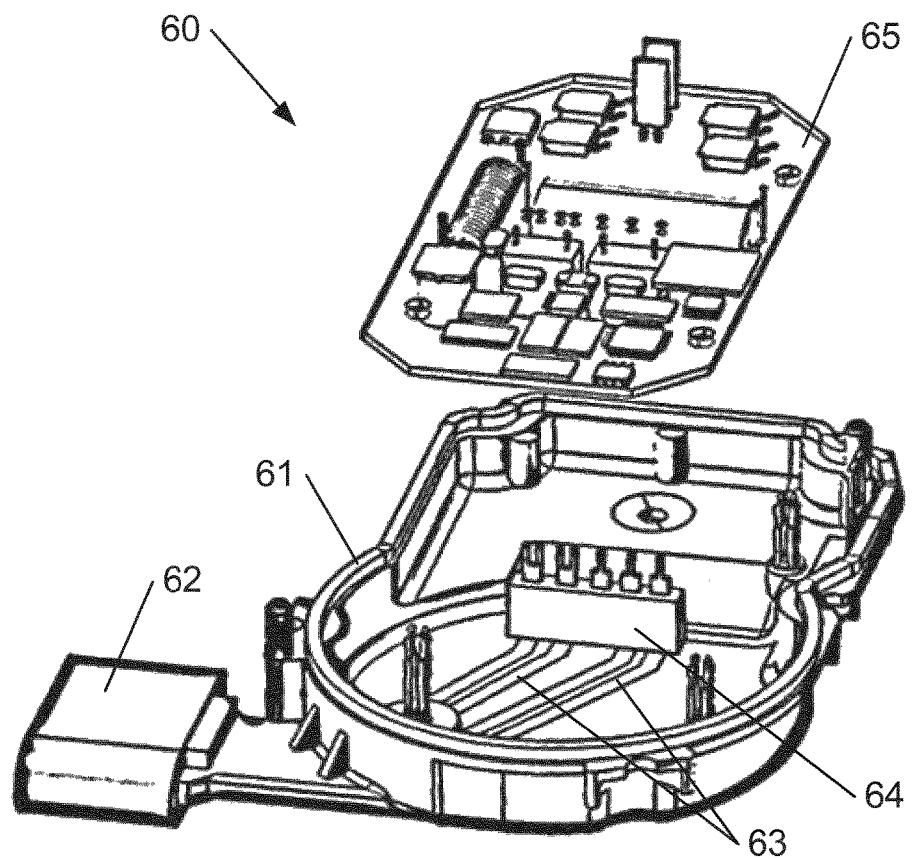
FIG. 6 is an exploded view of an embodiment of a control system according to the invention.

FIG. 6 shows an embodiment of a control system 60 according to the invention. The control system 60 comprises a housing 61 with an interface 62 for connecting a cable to provide electric current and to exchange communication signals with the electric motor and other systems of the vehicle (e.g. user controls, rain sensor, . . . ). Conductive paths 63 connect the interface 62 with a PCB interface 64 via which the electric current and the communication signals are transferred to a PCB 65 comprising the electronics of the controller, among which a microchip for controlling the wiping operation of the wipers 10, as described herein. The detecting means for detecting that the wiper arm position is uncertain and possibly also for detecting that upon return the arm enters into the collision risk zone 51 may for example comprise a sensor (not shown) at a drive shaft of the driving mechanism for the wipers 10, the sensor being provided for detecting at least some of the positions of the shaft, corresponding to for example the IW, OW, IP and DP positions. The sensor may be further provided for detecting that the wipers are in a position in between IW and OW, or such may be derived in the control system by the fact that the wipers are not in one of the other positions.

The control system 60 is provided with speed settings for controlling the speed of movement of the wipers 10, at least the normal wiping speed and the predetermined reduced speed, which is a reduced speed with respect to the normal wiping speed. A possible further speed setting is a fast wiping speed for cases of heavy rain.

Based on the information obtained by means of the sensor, or possibly other detecting means, the control system 60 is able to determine cases where there is a risk of collision between the arm and an edge part of the hood and to proactively apply the reduced speed for moving the wiper arm back to the starting position for a wiping sequence. This starting position can be the first position (IW), or possibly the IP or DP position. The control system 60 is provided for, in the initial sequence when returning the wiper arm to the first position after detection of an uncertain position, determining whether the wiper arm should be further moved to one of the inactive positions at the predetermined reduced speed, or whether a normal wiping sequence should be initiated, following a command received via the communication signals.

Figure 7:
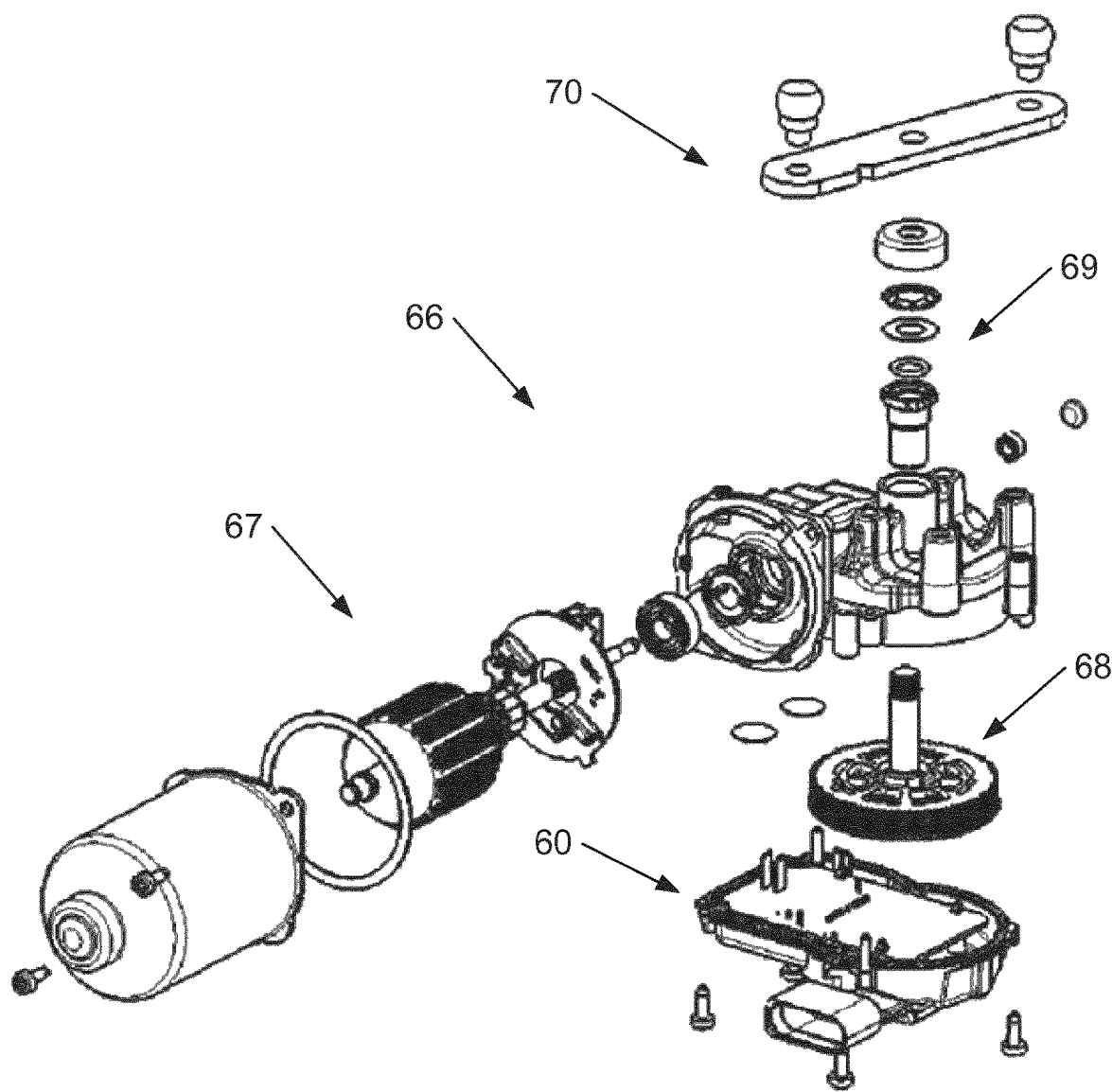
FIG. 7 is an exploded view of an embodiment of an integrated component unit comprising a control system and a driving mechanism according to the invention.

FIG. 7 further shows an embodiment of a driving mechanism 66 according to the invention, comprising a motor 67, a gear 68 for transmitting a rotary motion of the motor to a shaft 69. The motor may be a reversible motor or a continuous motor controlled by time. The shaft may be directly coupled with a wiper arm or via a crank assembly, a part 70 of which is shown. These parts of the driving mechanism and the control system are preferably combined into one integral component unit.

The invention claimed is:

1. A windscreen wiper control system controls a drive mechanism for at least one windscreen wiper arm to effect a reciprocating movement of the at least one windscreen wiper arm within a wiping range between a first position and a second position, wherein
the control system (60) comprises a position detector configured to detect, upon activation of said control system, an uncertain position of said windscreen wiper arm (14) within said wiping range but different from said first position (IW); and wherein
the control system is provided, upon detection of such an uncertain position, to return the windscreen wiper arm to the first position at a predetermined reduced speed, said reduced speed being applied at least in a sub-range of the wiping range in the vicinity of the first position.

2. The windscreen wiper control system according to claim 1, wherein said sub-range is defined as a collision risk zone, being a circle segment in which there is a risk of collision of the windscreen wiper arm with an edge part of a vehicle.

3. The windscreen wiper control system according to claim 1, wherein the predetermined reduced speed is below a normal wiping speed.

4. The windscreen wiper control system according to claim 1, wherein upon returning the windscreen wiper arm to the first position, the control system is provided for applying a predetermined speed profile, wherein the speed of movement of the windscreen wiper arm is a normal wiping speed as long as the windscreen wiper arm is considered to be outside said sub-range, and is reduced to the predetermined reduced speed as soon as the windscreen wiper arm is considered to enter the sub-range.

5. The windscreen wiper control system according to claim 1, wherein upon returning the windscreen wiper arm to the first position, the control system is provided for applying a predetermined speed profile, wherein the speed of movement of the windscreen wiper arm is the predetermined reduced speed over the whole wiping range.

6. The windscreen wiper control system according to claim 1, wherein upon returning the windscreen wiper arm to the first position, the control system is provided for further slowing down the movement of the windscreen wiper arm upon approaching the first position.

7. The windscreen wiper control system according to claim 1, wherein the control system comprises a collision detector configured to detect a collision of the windscreen wiper arm with an obstruction such as an edge part of the vehicle, and wherein the control system is provided, upon detection of such a collision, for reversing the movement of the windscreen wiper arm to remove the arm from the obstruction.

8. The windscreen wiper control system according claim 1, wherein the control system is further provided for controlling movement of the windscreen wiper arm to at least one inactive position adjacent to said first position but outside said wiping range.

9. The windscreen wiper control system according to claim 8, wherein said at least one inactive position is at least one of an intermittent pause position and a depressed park position.

10. A windscreen wiper assembly, comprising at least one windscreen wiper arm, a driving mechanism configured to drive a reciprocating movement of the windscreen wiper arm and a control system according to claim 1.

11. The windscreen wiper assembly of claim 10, wherein the windscreen wiper arm comprises, at a location where there is a risk of collision with an edge part of a vehicle, a buffer part comprising a resilient material.

12. The windscreen wiper assembly of claim 10, wherein the driving mechanism comprises a motor, a gear configured to transmit a rotary motion of the motor to a shaft of the windscreen wiper arm or a crank assembly for the windscreen wiper arm, and a sensor configured to detect a position of the shaft, the sensor forming part of the position detector of the control system.

13. A vehicle comprising a windscreen wiper assembly according to claim 10.

14. The vehicle according to claim 13, wherein an edge part of the vehicle comprises, at a location where there is a risk of collision with the windscreen wiper arm, a buffer part comprising a resilient material.

15. The windscreen wiper control system according to claim 2, wherein said circle segment is of 10°.

16. The windscreen wiper control system according to claim 3, wherein the predetermined reduced speed is below a predetermined maximum of 60°/second.

17. The windscreen wiper control system according to claim 3, wherein the predetermined reduced speed is between 60°/second and 30°/second.

18. The windscreen wiper assembly of claim 12, wherein the control system, the drive motor, the gear, the sensor and the shaft are combined into one integral component unit.

19. A method for controlling a drive mechanism for at least one windscreen wiper arm to effect a reciprocating movement of the at least one windscreen wiper arm within a wiping range between a first position and a second position, the method comprising the steps of:

detecting, by a position detector of a control system configured to control the drive mechanism, upon activation of the control system, an uncertain position of said windscreen wiper arm within said wiping range but different from said first position; and upon detection of such an uncertain position, returning the windscreen wiper arm to the first position at a predetermined reduced speed, said reduced speed being applied at least in a sub-range of the wiping range in the vicinity of the first position.

20. A microchip for a windscreen wiper control system, configured to perform the method of claim 19.

* * * * *